United States Patent

Kielhorn-Bayer et al.

[11] Patent Number: 5,834,542
[45] Date of Patent: Nov. 10, 1998

[54] IMPACT-RESISTANT THERMOPLASTIC MOLDING MATERIALS

[75] Inventors: Sabine Kielhorn-Bayer, Maxdorf; Ulrich Eichenauer, Böhl-Iggelheim, both of Germany; Friedhelm Lehrich, Grosse Ile, Mich.

[73] Assignee: BASF Aktiengesellschaft, Ludwigshafen, Germany

[21] Appl. No.: 849,187

[22] PCT Filed: Nov. 21, 1995

[86] PCT No.: PCT/EP95/04590

§ 371 Date: May 30, 1997

§ 102(e) Date: May 30, 1997

[87] PCT Pub. No.: WO96/17018

PCT Pub. Date: Jun. 6, 1996

[30] Foreign Application Priority Data

Dec. 1, 1994 [DE] Germany .......................... 44 42 722.0

[51] Int. Cl.[6] .......................................... C08K 5/29
[52] U.S. Cl. .................... 524/195; 525/127; 525/130; 525/399
[58] Field of Search .................. 524/190, 195; 525/399

[56] References Cited

U.S. PATENT DOCUMENTS

| | | | |
|---|---|---|---|
| 4,410,596 | 10/1983 | Matsumoto et al. | 428/412 |
| 4,640,949 | 2/1987 | Wagman | 514/227 |
| 4,819,572 | 4/1989 | Scholl et al. | 112/121.15 |
| 4,845,161 | 7/1989 | Richardson | 525/399 |

FOREIGN PATENT DOCUMENTS

| | | |
|---|---|---|
| 882 117 | 7/1980 | Belgium . |
| 116 456 | 8/1984 | European Pat. Off. . |
| 117 648 | 9/1984 | European Pat. Off. . |
| 548 815 | 6/1993 | European Pat. Off. . |
| 628 541 | 12/1994 | European Pat. Off. . |
| 37 03 232 | 8/1988 | Germany . |
| 993 600 | 5/1965 | United Kingdom . |
| 1 591 262 | 6/1981 | United Kingdom . |

OTHER PUBLICATIONS

Abstract J 5 6136–838.
Abstract J 5 8209–527.
Abstract J 5 7085–994.
Abstract J 6 3126–709.

*Primary Examiner*—Paul R. Michl
*Attorney, Agent, or Firm*—Keil & Weinkauf

[57] ABSTRACT

Impact-resistant thermoplastic molding materials contain

A) from 10 to 99.5% by weight of a thermoplastic polymer selected from the group consisting of the polyoxymethylenes, polyolefins, polyesters, polycarbonates, polystyrene, ABS, ASA, SAN, polyamides or poly(meth)acrylates or mixtures thereof, B) from 0.5 to 80% by weight of a thermoplastic polyurethane, C) from 0 to 50% by weight of a fibrous or particulate filler and D) from 0 to 30% by weight of conventional additives and processing assistants, the thermoplastic polyurethane B) containing from 0.05 to 10% by weight, based on B), of a carbodiimide:

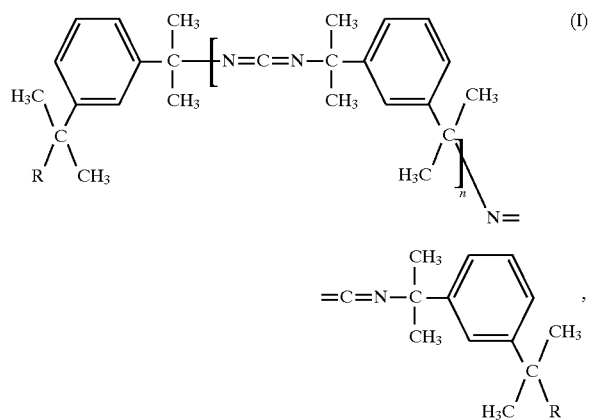

where

R is identical or different and is selected from the group consisting of —NCO—, —NHCONHR$^1$—, —NHCONR$^1$R$^2$— and —NHCOOR$^3$— radicals, where R$^1$ and R$^2$ are identical or different and are an alkyl, cycloalkyl or aralkyl radical and R$^3$ is R$^1$ or an alkoxypolyoxyalkylene radical and n is an integer from 0 to 10.

7 Claims, No Drawings

IMPACT-RESISTANT THERMOPLASTIC MOLDING MATERIALS

The present invention relates to impact-resistant thermoplastic molding materials containing
   A) from 10 to 99.5% by weight of a polyoxymethylene homo- or copolymer,
   B) from 0.5 to 80% by weight of a thermoplastic polyurethane,
   C) from 0 to 50% by weight of a fibrous or particulate filler or a mixture thereof and
   D) from 0 to 30% by weight of conventional additives and processing assistants,
the percentages by weight of the components A) to D) summing to 100%.

The present invention furthermore relates to the use of such molding materials for the production of moldings of any kind and to the moldings obtainable therefrom.

Polyoxymethylenes which contain thermoplastic polyurethanes as impact modifiers are disclosed, inter alia, in EP-A 116 456.

The blending of thermoplastic polyurethanes with other polymers is disclosed in:
   JP-A 56/1 368 38 blends of polyester and polyurethane
   JP-A 58/2 095 27 reinforced thermoplastic molding materials comprising two different thermoplastics and filler (eg. polyurethane+polystyrene or ABS+glass beads)
   JP-A 57/0 859 94 thermoplastic molding materials (eg. polyamide) with polyurethane, carbon black and metal sulfide powder
   BE-A 882 117 thermoplastic molding materials comprising TPU and modified PE and further thermoplastics, such as polyester
   JP-A 63/1 267 09 molding materials consisting of non-crystalline thermoplastics (eg. polyamide, PET, polyolefin or polyurethane) and crystalline thermoplastics (eg. polystyrene, PVC or ABS).

In some applications, for example sanitary engineering, high requirements are also set for stability to hydrolysis, to hot water and to damp humid conditions, in addition to good impact strength. Polymers such as polyoxymethylenes are known to be stable and resistant to conventional organic solvents or hot water, but TPU is not. Particularly during continuous use, such moldings composed of POM/TPU blend compositions tend to yellow and become brittle.

In EP-A 117 748, polycarbodiimides having a certain molecular weight and sterically hindered groups were incorporated into such blends for better stabilization of POM/TPU blends. The disadvantage of blends stabilized in this manner is the isocyanate elimination which occurs during processing. The tendency to yellow is not significantly changed by the addition of these polycarbodiimides since such moldings still have a yellowish coloration.

German Laid-Open Application DE-OS 3,703,232 described POM/TPU molding materials which are stabilized with alkaline earth metal salts of aliphatic, preferably hydroxyl-containing aliphatic monobasic to tribasic carboxylic acids. However, these additives are not suitable for increasing the stability of the molding materials to hydrolysis. Furthermore, the tendency to discoloration is high.

GB-B 993 600 discloses POM/TPU mixtures which contain polyamides and certain monocarbodiimides as stabilizers. However, the rigidity of such moldings is unsatisfactory. During processing, these monocarbodiimides moreover have the disadvantage that they are exuded, ie. coatings are formed in the injection mold.

U.S. Pat. No. 4,640,949 discloses POM/TPU mixtures which contain aromatic polycarbodiimides as stabilizers.

In the more recent European Patent Application No. 94108216.6 (prior art according to Art. 54(3)), novel carbodiimides for TPU were proposed.

It is an object of the present invention to provide impact-resistant thermoplastic molding materials which exhibit the following advantages:
   low yellowing after processing and on hot storage
   retention of toughness, elongation at break and tensile strength of the corresponding specimens on hot storage
   retention of toughness, elongation at break and tensile strength of the corresponding specimens in hot water
   minimal weight losses of the specimens under the influence of hot water and heat and also combined heat and moisture
   little evolution of isocyanate from the carbodiimides in the course of processing (toxicologically unobjectionable)
   formation of deposits in the injection mold should be avoided to the greatest extent possible (for polycarbodiimides).

We have found that this object is achieved by the molding materials defined at the outset, wherein the thermoplastic polyurethane B) contains from 0.05 to 10% by weight, based on B), of a carbodiimide of the formula I:

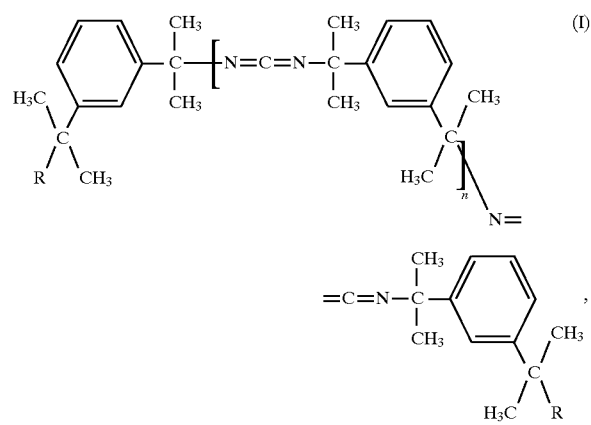

where
   R is identical or different and is selected from the group consisting of —NCO—, —NHCONHR$^1$—, —NHCONR$^1$R$^2$— and —NHCOOR$^3$— radicals, where
   R$^1$ and R$^2$ are identical or different and are an alkyl, cycloalkyl or aralkyl radical and
   R$^3$ is R$^1$ or an alkoxypolyoxyalkylene radical and
   n is an integer from 0 to 10.

Preferred embodiments are described in the subclaims.

The novel molding materials contain, as component A), from 10 to 99.5, preferably from 15 to 99, in particular from 20 to 95, % by weight of a polyoxymethylene homo- or copolymer.

Such polymers are known per se to a person skilled in the art and are described in the literature.

Very generally, these polymers contain at least 50 mol % of repeating units —CH$_2$O— in the polymer main chain.

The homopolymers are generally prepared by polymerizing formaldehyde or trioxane, preferably in the presence of suitable catalysts.

For the purposes of the present invention, preferred components A) are polyoxymethylene copolymers, in particular those which, in addition to the repeating units —CH$_2$O—, also contain up to 50, preferably from 0.1 to 20, in particular from 0.3 to 10, mol % of repeating units

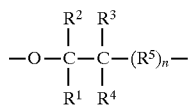

where R$^1$ to R$^4$, independently of one another, are each hydrogen, C$_1$–C$_4$-alkyl or halogen-substituted alkyl of 1 to 4 carbon atoms, R5 is —CH$_2$—, —CH$_2$O—, methylene substituted by C$_1$–C$_4$-alkyl or by C$_1$–C$_4$-haloalkyl, or a corresponding oxymethylene group, and n is from 0 to 3. Advantageously, these groups can be introduced into the copolymers by ring cleavage of cyclic ethers. Preferred cyclic ethers are those of the formula

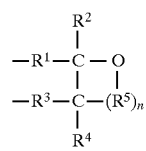

where R$^1$ to R$^5$ and n have the abovementioned meanings. Merely by way of example, ethylene oxide, 1,2-propylene oxide, 1,2-butylene oxide, 1,3-butylene oxide, 1,3-dioxane, 1,3-dioxolane and 1,3-dioxepan may be mentioned as cyclic ethers, and linear oligo- and polyformals, such as polydioxolane or polydioxepan, as comonomers.

Other suitable components A) are oxymethylene terpolymers, which are prepared, for example, by reacting trioxane and one of the cyclic ethers described above with a third monomer, preferably a bifunctional compound of the formula

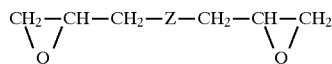

where Z is a chemical bond, —O—, —ORO— (R=C$_1$–C$_8$-alkylene or C$_2$–C$_8$-cycloalkylene).

Preferred monomers of this type are ethylenediglycide, diglycidyl ether and diethers of glycidyl compounds and formaldehyde, dioxane or trioxane in the molar ratio of 2:1, and diethers of 2 mol of the glycidyl compound and 1 mol of an aliphatic diol of 2 to 8 carbon atoms, for example the diglycidyl ethers of ethylene glycol, 1,4-butanediol, 1,3-butanediol, cyclobutane-1,3-diol, 1,2-propanediol and cyclohexane-1,4-diol, to mention but a few examples.

Processes for the preparation of the homo- and copolymers described above are known to a person skilled in the art and are described in the literature, so that further information is unnecessary here.

The preferred polyoxymethylene copolymers have melting points of at least 150° C. and weight average molecular weights M$_W$ of from 5000 to 200,000, preferably from 7000 to 150,000.

Polyoxymethylene polymers which have stabilized terminal groups and which possess C—C bonds at their chain ends are particularly preferred.

The novel molding materials contain, as component B), from 0.5 to 80, preferably from 1 to 60, in particular from 5 to 50, % by weight of a thermoplastic polyurethane (TPU) which contains from 0.05 to 10, preferably from 0.1 to 5, in particular from 0.2 to 2, very particularly preferably from 0.3 to 1.5, % by weight, based on B), of a carbodiimide of the formula I:

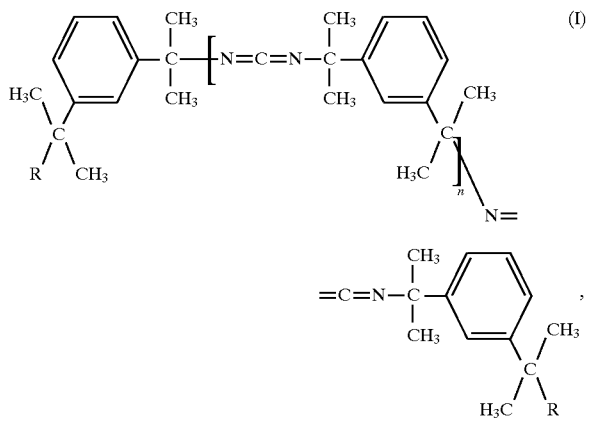

where

R is identical or different and is selected from the group consisting of —NCO—, —NHCONHR$^1$—, —NHCONR$^1$R$^2$— and —NHCOOR$^3$— radicals, where R$^1$ and R$^2$ are identical or different and are an alkyl, cycloalkyl or aralkyl radical and R$^3$ is R$^1$ or an alkoxypolyoxyalkylene radical and n is an integer from 0 to 10.

Suitable TPUs can be prepared, for example, by reacting a) organic, preferably aromatic, diisocyanates, b) polyhydroxy compounds having molecular weights of from 500 to 8000 and c) chain extenders having molecular weights of from 60 to 400 in the presence or absence of d) catalysts, e) assistants and/or additives.

The following may be stated in connection with the starting materials (a) to (c), catalysts (d) and assistants and additives (e) which may be used for this purpose:

a) examples of suitable organic diisocyanates (a) are aliphatic, cycloaliphatic and, preferably, aromatic diisocyanates. Specific examples are aliphatic diisocyanates, such as hexamethylene diisocyanate, cycloaliphatic diisocyanates, such as isophorone diisocyanate, cyclohexane 1,4-diisocyanate, 1-methylcyclohexane 2,4- and 2,6-diisocyanate, and the corresponding isomer mixtures, dicyclohexylmethane 4,4'-, 2,4'- and 2,2'-diisocyanate and the corresponding isomer mixtures and preferably aromatic diisocyanates, such as toluylene 2,4-diisocyanate, mixtures of toluylene 2,4- and 2,6-diisocyanate, diphenylmethane 4,4', 2,4'- and 2,2'-diisocyanate, mixtures of diphenylmethane 2,4'- and 4,4'-diisocyanate, urethanemodified liquid diphenylmethane 4,4'- and/or 2,4'-diisocyanates, 1,2-(4,4'-diisocyanatodiphenyl)ethane and naphthylene 1,5-diisocyanate. Hexamethylene diisocyanate, isophorone diisocyanate, naphthylene 1,5-diisocyanate, diphenylmethane diisocyanate isomer mixtures having a diphenylmethane 4,4'-diisocyanate content of more than 96% by weight and in particular diphenylmethane 4,4'-diisocyanate are preferably used.

b) Preferred relatively high molecular weight polyhydroxy compounds (b) having molecular weights of from 500 to 8000 are polyetherols and polyesterols. However, hydroxyl-containing polymers, for example polyacetals, such as polyoxymethylenes, and especially water-insoluble formals, for example polybutanediol formal and polyhexanediol formal, and polycarbonates, in particular those based on diphenyl carbonate and 1,6-hexanediol, prepared by transesterification and having the abovementioned molecular weights, are also suitable. The polyhydroxy compounds must be at least predominantly linear, ie. must be difunctional for the purposes of the isocyanate reaction. The stated polyhydroxy compounds may be used as individual components or in the form of mixtures.

Suitable polyetherols can be prepared by reacting one or more alkylene oxides where the alkylene radical is of 2 to 4 carbon atoms with an initiator molecule which contains two bonded active hydrogen atoms. Examples of alkylene oxides are ethylene oxide, 1,2-propylene oxide, and 1,2- and 2,3-butylene oxide. Ethylene oxide and mixtures of 1,2-propylene oxide and ethylene oxide are preferably used. The alkylene oxides may be used individually, alternately in succession or as a mixture. Examples of suitable initiator molecules are water, amino alcohols, such as N-alkyldiethanolamines, for example N-methyldiethanolamine, and diols, such as ethylene glycol, 1,3-propylene glycol, 1,4-butanediol and 1,6-hexanediol. If necessary, mixtures of initiator molecules may also be used. Other suitable polyetherols are the hydroxyl-containing polymerization products of tetrahydrofuran (polyoxytetramethylene glycols).

Preferred polyetherols are those obtained from 1,2-propylene oxide and ethylene oxide, in which more than 50%, preferably from 60 to 80%, of the OH groups are primary hydroxyl groups and in which at least some of the ethylene oxide is arranged as a terminal block, in particular polyoxytetramethylene glycols.

Such polyetherols can be obtained by polymerizing first 1,2-propylene oxide and then ethylene oxide with the initiator molecule, or first copolymerizing the total amount of 1,2-propylene oxide as a mixture with some of the ethylene oxide and then polymerizing on the remainder of the ethylene oxide, or polymerizing first some of the ethylene oxide, and then the total amount of 1,2-propylene oxide and then the remainder of the ethylene oxide with the initiator molecular in a stepwise procedure.

The essentially linear polyetherols have molecular weights of from 500 to 8000, preferably from 600 to 6000, in particular from 800 to 3500. They can be used both individually and in the form of mixtures with one another.

Suitable polyesterols can be prepared, for example, from dicarboxylic acids of 2 to 12, preferably 4 to 8, carbon atoms and polyhydric alcohols. Examples of suitable dicarboxylic acids are aliphatic dicarboxylic acids, such as succinic acid, glutaric acid, adipic acid, suberic acid, azelaic acid and sebacic acid, and aromatic dicarboxylic acids, such as phthalic acid, isophthalic acid and terephthalic acid. The dicarboxylic acids may be used individually or as mixtures, for example in the form of mixtures of succinic, glutaric and adipic acid. Mixtures of aromatic and aliphatic dicarboxylic acids may also be used. For the preparation of the polyesterols, it may be advantageous to use, instead of the dicarboxylic acids, the corresponding dicarboxylic acid derivatives, such as dicarboxylic esters where the alcohol radical is of 1 to 4 carbon atoms, dicarboxylic anhydrides or dicarbonyl chlorides. Examples of polyhydric alcohols are glycols of 2 to 10, preferably 2 to 6, carbon atoms, such as ethylene glycol diethylene glycol, 1,4-butanediol, 1,5-pentanediol, 1,6-hexanediol, 1,10-decanediol, 2,2-dimethyl-1,3-propane-diol, 1,3-propanediol and dipropylene glycol. Depending on the desired properties, the polyhydric alcohols may be used alone or, if required, as mixtures with one another.

Esters of carbonic acid with the stated diols, in particular those of 4 to 6 carbon atoms, such as 1,4-butanediol and/or 1,6-hexanediol, condensates of (ω-hydroxycarboxylic acids, for example (ω-hydroxycaproic acid, and preferably polymerization products of lactones, for example unsubstituted or substituted ω-caprolactones, are also suitable.

Preferably used polyesterols are dialkylene glycol polyadipates where the alkylene radical is of 2 to 6 carbon atoms, eg. ethanediol polyadipates, 1,4-butanediol polyadipates, ethanediol butanediol 1,4-polyadipates, 1,6-hexanediol neopentylglycol polyadipates, polycaprolactones and in particular 1,6-hexanediol 1,4-butanediol polyadipates.

Polyesterols have molecular weights of from 500 to 6000, preferably from 800 to 3500.

Preferred chain extenders (c) having molecular weights of from 60 to 400, preferably from 60 to 300, are aliphatic diols of 2 to 12, preferably 2,4 or 6, carbon atoms, eg. ethanediol, 1,6-hexanediol, diethylene glycol, dipropylene glycol and in particlar 1,4-butanediol. However, diesters of terephthalic acid with glycols of 2 to 4 carbon atoms are also suitable, eg. bis(ethylene glycol) terephthalate or bis(1,4-butanediol) terephthalate, hydroxyalkylene ethers of hydroquinone, eg. 1,4-di(β-hydroxyethyl)hydroquinone, (cyclo)aliphatic diamines, eg. 4,4'-diaminodicyclohexyl-methane, 3,3'-dimethyl-4,4'-diaminodicyclohexylmethane, isophoronediamine, ethylenediamine, 1,2- and 1,3-propylene-diamine, N-methyl-1,3-propylenediamine and N,N'-dimethyl-ethylenediamine, and aromatic diamines, eg. 2,4- and 2,6-toluylenediamine, 3,5-diethyl-2,4- and -2,6-toluylene-diamine and primary ortho-dialkyl-, trialkyl- and/or tetraalkyl-substituted 4,4'-diaminodiphenylmethanes.

In order to establish the hardness and melting point of the TPU, the components (b) and (c) can be varied within relatively wide molar ratios. Molar ratios of polyhydroxy compounds (b) to chain extenders (c) are from 1:1 to 1:12, in particular from 1:1.8 to 1:6.4, have proven particularly useful, the hardness and the melting point of the TPU increasing with increasing content of diols.

For the preparation of the TPU, the components (a), (b) and (c) are reacted in the presence or absence of catalysts (d) and assistants and/or additives (e) in amounts such that the ratio of the number of equivalents of NCO groups of the diisocyanates (a) to the total number of equivalents of hydroxyl groups or hydroxyl and amino groups of components (b) and (c) is from 1:0.85 to 1:1.20, preferably from 1:0.95 to 1:1.05, in particular from 1.098 to 1:1.02.

d) Suitable catalysts which in particular accelerate the reaction between the NCO groups of the diisocyanates (a) and the hydroxyl groups of the components (b) and (c) are the conventional prior art tertiary amines, eg. triethylamine, dimethylcyclohexylamine, N-methylmorpholine, N,N'-dimethylpiperazine, 2-(dimethylaminoethoxy)ethanol, diazabicyclo[2.2.2]octane and the like, and in particular organic metal compounds, such as esters of titanic acid, iron compounds, such as iron(III) acetylacetonate, tin compounds, eg. tin diacetate, tin dioctoate, tin dilaurate or the dialkyltin salts of aliphatic carboxylic acids, such as dibutyltin diacetate, dibutyltin dilaurate or the like. The catalysts are usually used in amounts from 0.001 to 0.1 part per 100 parts of polyhydroxy compound (b).

In addition to catalysts, assistants and/or additives (e) may also be incorporated into the components (a) to (c). Examples are lubricants, inhibitors, stabilizers against hydrolysis, light, heat or discoloration, dyes, pigments, inorganic and/or organic fillers and plasticizers.

Further information about the abovementioned assistants and additives appears in the technical literature, for example the monograph by J. H. Saunders and K. C. Frisch High Polymers, Volume XVI, Polyurethane, Parts 1 and 2, Interscience Publishers 1962 or 1964, German Laid-Open Application DOS 2,901,774.

The novel carbodiimides and/or oligomeric polycarbodiimides have sterically hindered isocyanate, urea and/or urethane groups bonded to a methylene group, have high resistance to hydrolysis, at least comparable with the industrially used aromatic carbodiimides and aromatic polycarbodiimides, in combination with high light stability and, on compliance with the work safety regulations, can be economically metered and incorporated into the TPU containing ester groups without problems and without additional homogenization steps. Also advantageous is the large number of effective carbodiimide groups, based on the molecular weight of the (poly)carbodiimides, their low vapor pressure and the negligible migration and blooming behavior. The (poly)carbodiimides are compatible with the TPU containing ester groups, in particular with polyesterurethanes, and, owing to their low melting point, can also be homogeneously mixed with these materials in the melt without problems.

In the reaction with carboxylic acids and/or carboxyl-containing compounds, the novel carbodiimides and oligomeric polycarbodiimides give araliphatic isocyanates having a low reactivity in comparison with aromatic isocyanates. The araliphatic isocyanates formed therefore have virtually no influence on the characteristic of the polyaddition reaction in the urethane formation. Consequently, the molecular weights of polyurethanes formed and hence their mechanical properties are constant and very readily reproducible. Another advantage is that the degradation products formed from the isocyanates have no bound aromatic amine groups and are therefore to be regarded as toxicologically relatively unproblematic.

In addition to the monomeric carbodiimides, advantageously used oligomeric polycarbodiimides are those having an average degree of condensation (number average) of from 2 to 10, preferably from 2 to 5, or mixtures thereof or mixtures of mono- and oligomeric polycarbodiimides, since these can as a rule be particularly readily introduced into the TPU to be stabilized and containing ester groups. Polycarbodiimides having a higher degree of condensation are as a rule solid, high-melting compounds which are not sufficiently compatible with the plastics matrix and are therefore more difficult to mix homogeneously with the TPU.

The novel carbodiimides and/or oligomeric polycarbodiimides of the formula (II)

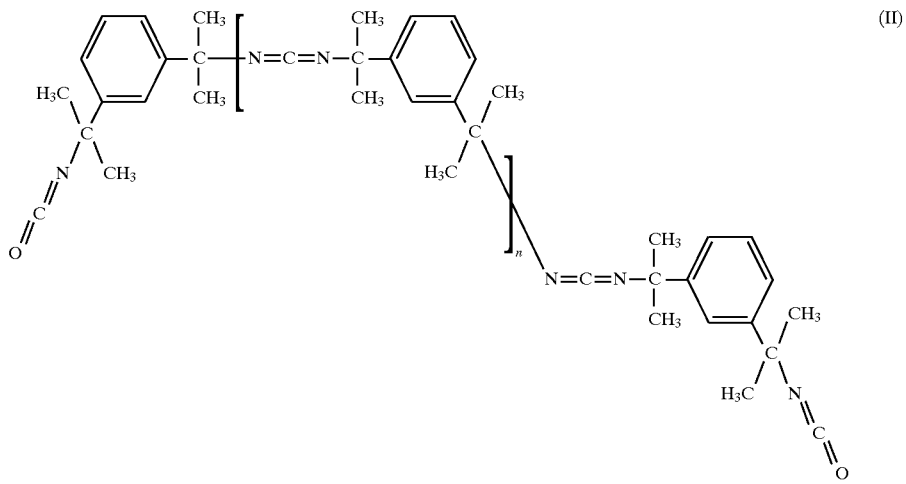

also have reactive isocyanate groups and can therefore react with compounds having NCO-reactive hydrogen atoms and can thus be chemically bonded in the polyadducts or polycondensates. In order to improve the shelf life of the (poly)carbodiimides, some or all of the terminal isocyanate groups may be blocked, for example with C—H— or N—H-reactive compounds, for example malonates, acetylacetone, acetoacetates, phthalimide, caprolactam or benzenesulfonamide, or can be partially or completely saturated by reaction with aliphatic, cycloaliphatic or araliphatic amines, alcohols or polyoxyalkylene alcohols and their physical properties, for example their solubility or compatibility, can thus be modified in a specific manner.

Amines, alcohols and polyoxyalkylene alcohols are used to enable the isocyanate groups of the (poly)carbodiimides to be saturated, as already mentioned above. Suitable amines, for example primary or, preferably, secondary amines, advantageously have 1 to 12, preferably 2 to 8, carbon atoms. Methyl-, ethyl-, propyl-, butyl-, pentyl-, hexyl-, 2-ethylhexyl-, octyl-, decyl-, diethyl-, dipropyl-, dibutyl-, methylbutyl-, ethylbutyl- and ethylhexylamine and cyclohexyl- and benzylamine may be mentioned by way of example. However, alcohols, for example primary or secondary alcohols of 1 to 18, preferably 2 to 8, carbon atoms and in particular alkoxypolyoxyalkylene alcohols having 1 to 10, preferably 1 to 4, carbon atoms in the alkoxy group and a molecular weight of from 76 to 2000, preferably from 400 to 1000 (number average) are preferably used for saturating the isocyanate groups. The following may be mentioned as examples of primary or secondary alcohols, methanol, ethanol, n-propanol, isopropanol, n-butanol, secondary butanol, n-pentanol, technical-grade pentanol mixtures, n-hexanol, technical-grade hexanol mixtures, 2-ethylhexanol, octanol, 2-ethyloctanol, decanol and dodecanol as well as cyclohexanol and benzyl alcohol. For example, polyoxybutylene, polyoxypropylene, polyoxypropylene- polyoxyethylene and preferably polyoxyethylene alcohols, which may have, for example, a methoxy, ethoxy, n-propoxy, isopropoxy or n-butoxy group bound as a terminal alkoxy group, has proven useful as alkoxypolyoxyalkylene alcohols. Depending on the type of polyoxyalkylene radicals used, the (poly)carbodiimides may be made hydrophilic, water-soluble, to hydrophobic, fat-soluble.

For the preparation of the novel carbodiimides and/or oligomeric polycarbodiimides, 1,3-bis(1-methyl-1-isocyanatoethyl)benzene may be subjected to a condensation reaction at elevated temperatures, for example at from 50° to 200° C., preferably from 150° to 185° C., advantageously in the presence of catalysts, with elimination of carbon dioxide. Processes suitable for this purpose are described, for example, in GB-A-1 083 410, DE-B 1 130 594 (GB-A-851 936) and DE-A-11 56 401 (US-A-3 502 722). Catalysts which have proven excellent are, for example, phosphorus compounds, which are preferably selected from the group consisting of the phospholenes, phospholene oxides, phospholidines and phospholine oxides. The polycarbodiimide formation is usually ended when the reaction mixture has the desired content of NCO groups, corresponding to a degree of condensation n of up to 10. For this purpose, the catalysts can be distilled off under reduced pressure or can be deactivated by adding a deactivator, for example phosphorus trichloride. The polycarbodiimide preparation may furthermore be carried out in the presence or absence of solvents which are inert under the reaction conditions.

A person skilled in the art can establish the degree of condensation in the usual manner by a suitable choice of the reaction conditions, for example the reaction temperature, the type of catalyst and the amount of catalyst and the reaction time. The course of the reaction can be most simply monitored by determining the NCO content. Other parameters too, for example increasing viscosity, deepening of color or $CO_2$ evolution, may be used for monitoring and controlling the reaction.

After the end of the condensation, the free terminal isocyanate groups of the carbodiimide and/or of the oligomeric polycarbodiimides can be blocked with C—H— or N—H-reactive hydrogen compounds or some or all of said groups can be saturated with aliphatic, cycloaliphatic and/or araliphatic amines, alcohols of these types and/or alkoxypolyoxyalkylene alcohols. In accordance with an advantageous embodiment, for complete saturation of the isocyanate groups, the aliphatic, cycloaliphatic or araliphatic amines, alcohols and/or alkoxypolyoxyalkylene alcohols are preferably added in an amount corresponding to a small excess of —OH—, —NH— and/or —$NH_2$-groups relative to NCO groups of the (poly)carbodiimide-containing reaction mixture and allowed to react there and, if required, the unreacted amount is then distilled off, preferably under reduced pressure.

In another, preferably used process variant, the novel (poly)carbodiimides in which some or all of the isocyanate groups are saturated can be prepared by a procedure in which first up to 50, preferably up to 23, % by weight of the isocyanate groups of the 1,3-bis(1-methyl-1-isocyanatoethyl)benzene are reacted with at least one aliphatic, cycloaliphatic or araliphatic amine, alcohol and/or alkoxypolyoxyalkylene alcohol and then some or all of the free isocyanate groups are subjected to a condensation reation, in the presence of catalysts, with elimination of carbon dioxide, to give carbodiimides and/or oligomeric polycarbodiimides.

Novel monocarbodiimides and/or oligomeric polycarbodiimides are very suitable as an acceptor for carboxyl compounds. Owing to the good solubility, in particular of the monocarbodiimides, in the components for the preparation of polyurethanes and the good compatibility, in particular of the oligomeric polycarbodiimides, with the polyurethanes formed, and the reactivity of the NCO-containing (poly)carbodiimides with compounds having reactive hydrogen atoms, the novel (poly)carbodiimides are particularly suitable as stabilizers for preventing the hydrolytic degradation of TPU.

The concentration of the novel monocarbodiimides and/or oligomeric polycarbodiimides in the polycondensates or polyadducts to be stabilized and containing ester groups is in general from 0.05 to 10, preferably from 0.1 to 5, % by weight. In specific cases, the concentration may also be higher, depending on the stress to which the plastic is subjected by hydrolysis.

The monocarbodiimides and/or oligomeric polycarbodiimides which may be used according to the invention can be introduced by various methods into the TPU to be stabilized and containing ester groups. For example, the novel (poly)carbodiimides can be mixed with one of the components for the preparation of the TPU, for example with the polyisocyanates and/or polyhydroxy compounds, or the (poly)carbodiimides may be metered into the reaction mixture for the preparation of the TPU. In another procedure, the novel (poly)carbodiimides can be incorporated into the melt of the reacted TPU. However, it is also possible to coat TPU granules with the novel (poly)carbodiimides and to introduce these into the plastics materials during the subsequent production of moldings by melt extrusion. In a preferred embodiment for the preparation of polyurethane casting elastomers and TPU based on polyester-polyols, the carboxyl-containing polyester-polyols are first treated with the novel (poly)carbodiimides to reduce the acid contents and, if necessary after the addition of further amounts of (poly)carbodiimides, said (poly)carbodiimides are then reacted with polyisocyanates, in the presence or absence of additional assistants and additives.

The novel molding materials may contain, as component C), from 0 to 50, preferably up to 40, % by weight of a fibrous or particulate filler or a mixture thereof.

Examples of reinforcing fillers are potassium titanate whiskers, carbon fibers and preferably glass fibers, and the glass fibers may be used, for example, in the form of woven glass fabrics, glass mats, glass surface mats and/or glass rovings or chopped glass filaments of low-alkali E-glass having a diameter of from 5 to 200 $\mu$m, preferably from 8 to 50 $\mu$m, the fibrous fillers preferably having an average length from 0.05 to 1 mm, in particular from 0.1 to 0.5 mm, after they have been incorporated.

Other suitable fillers are, for example, wollastonite, calcium carbonate, glass beads, quartz powder, silicon nitride and boron nitride or mixtures of these fillers.

In addition to the components A) and B) and, if required, C), the novel molding materials may also contain conventional additives and processing assistants D) in amounts of up to 30, preferably up to 20, % by weight. Formaldehyde scavengers, plasticizers, lubricants, antioxidants, adhesion promoters, light stabilizers and pigments may be mentioned here merely by way of example. The amount of such additives is in general from 0.001 to 5% by weight.

According to a preferred embodiment, the novel molding materials may contain a maleic acid/formaldehyde condensate as a nucleating agent. Suitable products are described, for example, in DE 25 40 207.

Corresponding compounds are known to a person skilled in the art and are described, for example, in EP-A 327 384.

The novel thermoplastic molding materials are prepared by mixing the components in a manner known per se, and detailed information is therefore unnecessary. The components are advantageously mixed in an extruder.

The novel thermoplastic molding materials have a balanced property spectrum, in particular form very little coating on the mold during processing.

The novel thermoplastic molding materials have a balanced property spectrum, in particular the mechanical properties, such as toughness and elongation at break, are retained on storage in hot water and under the influence of damp heat.

Accordingly, they are suitable for the production of moldings of any type, applications in sanitary engineering (for example fittings) being particularly preferred.

EXAMPLES

Component A

Polyoxymethylene copolymer comprising 97.3% by weight of trioxane and 2.7% by weight of butanediol formal. The product also contained about 3% by weight of unconverted trioxane and 5% by eight of thermally unstable components. After degradation of the thermally unstable components, the copolymer had a melt flow index of 10 g/10 min (190° C., 2.16 kg, according to DIN 53 735).

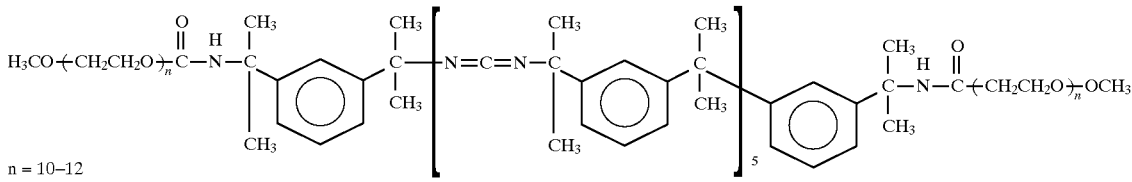

n = 10–12

Component D

D1 Glyceryl distearate (Loxiol® VP 1206 from Henkel)
D2 Synthetic magnesium silicate (Ambosol® from Société Nobel, Bozel, Puteaux) having the following properties:
 content of MgO: >14.8% by weight
 content of $SiO_2$: >59% by weight
 $SiO_2$:MgO ratio: 2.7 mol/mol
 bulk density: from 20 to 30 g/100 mol
 loss on ignition: <25% by weight
Preparation of the polyoxymethylene molding materials
Granules of components A and B were first mixed with component D in a tumbling mixer.

In a twin-screw extruder (ZKS 30, Werner & Pfleiderer), components A and B were melted at 190° C., thoroughly mixed, extruded, cooled and granulated.

2 products having the following composition were prepared:

TABLE 1

| | Percent by weight of component | | | |
|---|---|---|---|---|
| Example | A | B | D1 | D2 |
| 1 | 79.6 | 20 B1 | 0.3 | 0.1 |
| 2 (Comparison) | 79.6 | 20 B2 | 0.3 | 0.1 |

Dumbbells were injection molded according to ISO 9988, Part 2, in an injection molding machine at a melt temperature of 200° C. and a mold temperature of 80° C.

High-temperature storage tests were carried out on the dumbbells at 100° C., and the color differences ΔE were determined against a polyoxymethylene standard using the CIELAB formula according to DIN 6174 and DIN 5033 (calculation and procedure for the measurement).

Furthermore, the tensile strength and the elongation at break after high-temperature storage at 100° C. were measured according to ISO 527.

The data are shown in Table 2.

TABLE 2

| Storage time | ΔE | | Tensile strength $N/mm^2$ | | Elongation at break % | |
|---|---|---|---|---|---|---|
| weeks | Ex. 1 | Ex. 2 | Ex. 1 | Ex. 2 | Ex. 1 | Ex. 2 |
| 0 | 3.3 | 3.5 | 49.1 | 48.2 | 51.1 | 56.3 |
| 1 | 6.0 | 6.0 | 51.8 | 51.0 | 47.7 | 51.2 |
| 2 | 7.5 | 8.4 | 52.3 | 51.1 | 41.1 | 50.4 |
| 3 | 6.8 | 7.5 | 52.2 | 51.1 | 35.7 | 35.4 |
| 4 | 7.7 | 9.5 | 52.0 | 51.4 | 43.3 | 44.1 |
| 5 | 8.2 | 10.8 | 52.1 | 51.4 | 46.4 | 47.0 |
| 6 | 10.0 | 11.5 | 51.8 | 51.1 | 44.6 | 42.1 |
| 7 | 10.4 | 11.5 | 51.5 | 52.2 | 37.3 | 40.0 |
| 8 | 11.4 | 13.1 | 52.5 | 51.5 | 34.2 | 36.4 |
| 9 | 10.7 | 13.8 | 51.6 | 52.3 | 41.0 | 43.9 |
| 10 | 12.4 | 15.1 | 52.5 | 51.9 | 39.8 | 37.2 |

Dumbbells of the products of Examples 1 and 2 were stored in water at 100° C., and the tensile strength and the elongation at break according to ISO 527 were measured. The values are shown in Table 3.

TABLE 3

| Storage time | Tensile strength $N/mm^2$ | | Elongation at break % | |
|---|---|---|---|---|
| weeks | Ex. 1 | Ex. 2 | Ex. 1 | Ex. 2 |
| 0 | 49.1 | 48.2 | 51.1 | 56.3 |
| 1 | 46.1 | 45.1 | 55.7 | 56.8 |
| 2 | 45.8 | 43.6 | 46.1 | 48.3 |
| 3 | 40.3 | 39.5 | 58.1 | 52.6 |
| 4 | 39.6 | 38.7 | 39.1 | 39.1 |
| 5 | 38.5 | 36.8 | 23.9 | 19.2 |
| 6 | 32.8 | 27.5 | 9.7 | 6.7 |

As is evident from Table 2, Example 1 shows a smaller increase in the color difference ΔE on high-temperature storage than Example 2, ie. the tendency to discolor is smaller. The mechanical properties are retained after storage at high temperature.

With regard to the mechanical properties during storage in hot water (cf. Table 3), the product from Example 1 also behaves more advantageously than that of Example 2.

We claim:

1. An impact-resistant thermoplastic molding material containing
    A) from 10 to 99.5% by weight of a thermoplastic polymer selected from the group consisting of the polyoxymethylenes, polyolefines, polyesters, polycarbonates, polystyrene, ABS, ASA, SAN, polyamides and poly(meth)acrylates and mixtures thereof,
    B) from 0.5 to 80% by weight of a thermoplastic polyurethane,
    C) from 0 to 50% by weight of a fibrous or particulate filler or a mixture thereof and
    D) from 0 to 30% by weight of conventional additives and processing assistants, the percentages by weight of the components A) to D) summing to 100%, wherein the thermoplastic polyurethane B) contains from 0.05 to 10% by weight, based on B), of a carbodiimide of the formula I

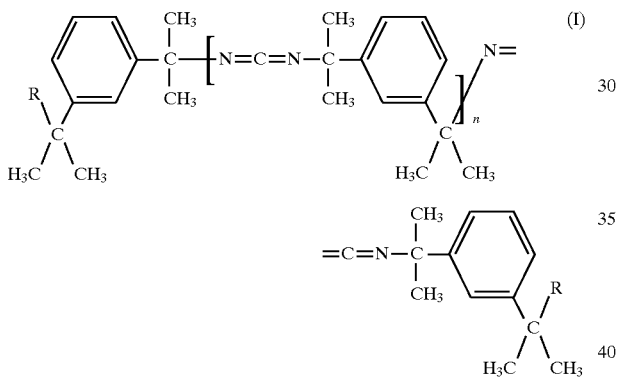

where
    R is identical or different and is selected from the group consisting of —NCO—, —NHCONHR$^1$—, —NHCONR$^1$R$^2$— and —NHCOOR$^3$-radicals, where
    R$^1$ and R$^2$ are identical or different and are an alkyl, cycloalkyl or aralkyl radical and
    R$^3$ is R$^1$ or an alkoxypolyoxyalkylene radical and
    n is an integer from 0 to 10.

2. The impact resistant thermoplastic molding material defined in claim 1, wherein the thermoplastic polyurethane B) contains from 0.05 to 5% by weight, based on B), of a carbodiimide of the formula I.

3. The impact resistant thermoplastic molding material defined in claim 1, wherein R is an —NHCOOR$^3$ group and R$^3$ is an alkoxypolyoxyalkylene radical having a molecular weight of from 76 to 2000.

4. The impact resistant thermoplastic molding material defined in claim 1, wherein component B) contains a carbodiimide of the formula II

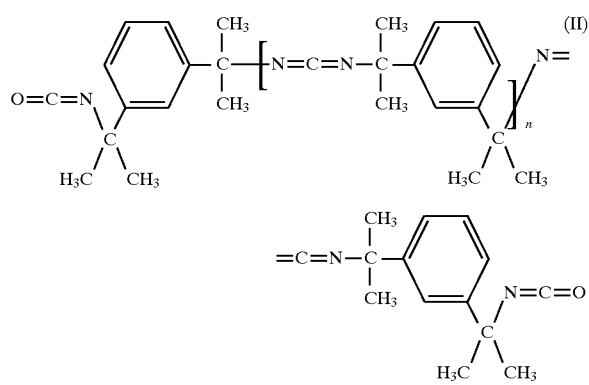

where n is an integer from 0 to 10.

5. The impact resistant thermoplastic molding material defined in claim 1, wherein the carbodiimide of the formula I is obtainable
    a) by condensation, with elimination of carbon dioxide, of 1,3-bis(1-methyl-1-isocyanatoethyl)benzene and, if required, reaction of some or all of the terminal isocyanate groups of the resulting carbodiimide and/or of the resulting oligomeric polycarbodiimides with at least one aliphatic, cycloaliphatic or araliphatic amine, alcohol and/or alkoxypolyoxyalkylene alcohol or
    b) by reaction of up to 50% of the isocyanate groups of the 1,3-bis(1-methyl-1-isocyanatoethyl)benzene with at least one aliphatic, cycloaliphatic or araliphatic amine, alcohol and/or alkoxypolyoxyalkylene alcohol and subsequent condensation of the free isocyanate groups with elimination of carbon dioxide.

6. The impact resistant thermoplastic molding material defined in claim 4, wherein the carbodiimide of the formula II is obtainable by condensation, with elimination of carbon dioxide, of 1,3-bis(1-methyl-1-isocyanatoethyl)benzene.

7. A molding obtainable from an impact-resistant thermoplastic molding material as claimed in claim 1.

* * * * *